Figure 4:
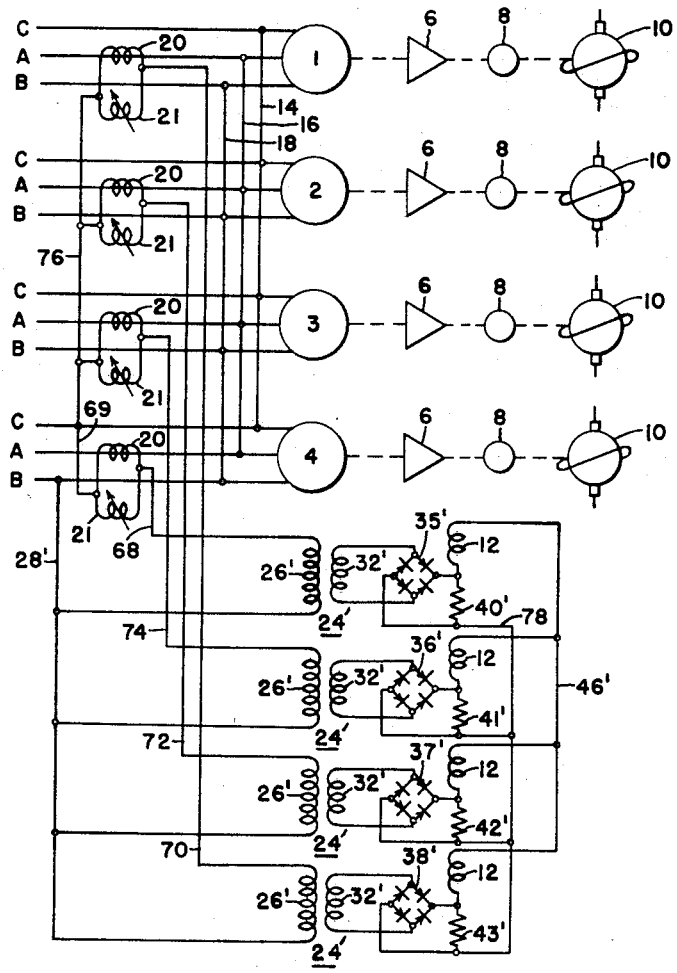

Nov. 24, 1959 A. S. RUBENSTEIN 2,914,680
LOAD REGULATOR
Filed Dec. 10, 1956 2 Sheets-Sheet 1

INVENTOR:
ALAN S. RUBENSTEIN,
BY *Melvin M. Goldenberg*
HIS ATTORNEY.

Nov. 24, 1959     A. S. RUBENSTEIN     2,914,680
LOAD REGULATOR
Filed Dec. 10, 1956     2 Sheets-Sheet 2
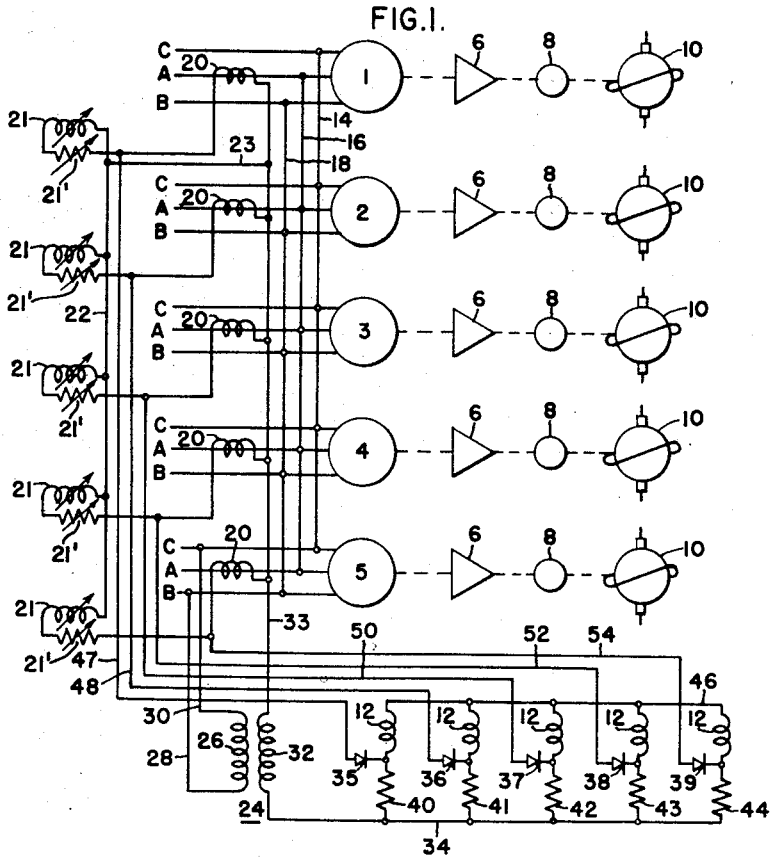
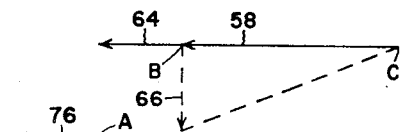
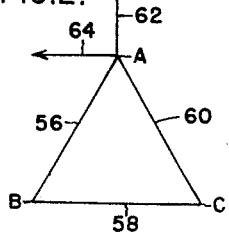
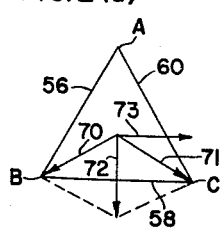
INVENTOR:
ALAN S. RUBENSTEIN,
BY *Melvin M. Goldenberg*
HIS ATTORNEY.

United States Patent Office 2,914,680
Patented Nov. 24, 1959

2,914,680

LOAD REGULATOR

Alan S. Rubenstein, Waynesboro, Va., assignor to General Electric Company, a corporation of New York Application December 10, 1956, Serial No. 627,264

7 Claims. (Cl. 290—4)

This invention relates to improvements in regulators for dynamoelectric machines and, more particularly, to means regulating the output of the number of alternating current dynamoelectric machines to insure a predetermined distribution of the load.

In a facility wherein a plurality of alternating current generators are provided, there are distinct advantages in providing for a uniform distribution of the load between them. One such advantage is that if the load requirements are not such that all generators are operating at full load and if the load is distributed equally between all of the generators, then there is still a margin to assume additional load at a response rate which would be greater than if only one of the generators were required to assume the additional load. An additional advantage is that since generator and prime mover units usually have greater efficiencies at or near full load, a uniform distribution of the load will assure that no generator is operating at a relatively low load and, therefore, a relatively less efficiency. In the past it has been the practice to distribute load amongst generators by the use of bridge circuits. However, since any bridge circuit can only compare two signals, it has only been possible to distribute load amongst two generators.

Therefore, it is an object of this invention to provide a novel means for regulating the output of any number of alternating current generators and to insure predetermined distribution of the load between the generators.

It has been found that the control devices for generators do not have the same gain nor the same hysteresis curve. Further, the generators may be driven by turbines and each unit in a group will have different characteristics and different efficiencies. For example, the governors usually provided therewith are not linear and not equal and the application of the same control signal to a means determining the setting of the governor does not insure that all generators will have the same output.

It is a further object of this invention to provide a novel circuit utilizing static devices for the output regulation of a plurality of alternating current generators wherein a predetermined distribution of the load is accomplished even though the individual generators and prime movers and control systems possess different characteristics.

It is a still further object of this invention to provide a novel device for regulating a plurality of alternating current generators wherein individual control signals proportional to the output of the generator departing from a predetermined distribution of the load are derived by the device and are supplied to suitable controls to enable a re-distribution of the load on each generator.

In accordance with my invention I provide in one embodiment thereof a means for deriving a voltage proportional to the relative voltage between two phases of a three-phase alternating current developed by a plurality of alternating current generators and supplying this voltage to a means for developing a control signal which is supplied to the controller of each generator prime mover. A signal proportional to the current in one phase of each generator output is added to the control signal developing means along with the voltage signal. This latter signal is proportional to the power output of each generator and is such that any change in its magnitude has a considerable effect in the over-all control signal. The control signal developing means are connected in parallel so that control current will flow in all branches tending to maintain the voltages therein equal.

The subject matter which I regard as my invention is particularly pointed out and distinctly claimed in the concluding portion of this specification. My invention, however, both as to its organization and method of operation together with further objects and advantages thereof, may best be understood by reference to the following description taken in connection with the accompanying drawing in which:

Fig. 1 is a schematic diagram of a circuit incorporating my invention in conjunction with a plurality of alternating current generators whose output is to be regulated;

Figs. 2, 2(a), 2(b) and 2(c) show vector diagrams of certain voltages and currents between the three phases of a three-phase alternating current generator;

Fig. 3 is a vector diagram of the derived signals which are proportional to the voltage between two of the phases and the current at another of the phases showing the effect of changes in current on the control signal; and Fig. 4 is a schematic diagram of a circuit incorporating an alternative embodiment of my invention in conjunction with a plurality of alternating current generators whose output is to be regulated.

Referring now to Fig. 1 of the drawing, I show an embodiment of my invention associated with a plurality of paralleled alternating current generators illustrated schematically at 1, 2, 3, 4 and 5. Each generator is driven by a prime mover which may take the form of a turbine device which is illustrated schematically at 6. A governor or other speed control means not shown is positioned by means of a small direct current motor 8. The direction of rotation and, therefore, the setting of the speed control means for the prime mover 6 is determined by the output of an amplifying device such as the amplidyne 10 shown schematically controlling the direct current motor 8. The input signal to the control element of the amplifying device in this case may be supplied to the amplidyne control field windings shown at 12 for each of the alternating current generator units. The fields are physically associated with the amplidynes 10 in the manner well known in the art, but are shown in the drawing in this manner for purposes of clarity. It should be understood that other control fields may be provided for the amplidynes 10 energized by other local regulators. Alternatively, grid controlled vacuum or gas filled tubes may be used for this purpose. Such a system is disclosed in the patent to M. A. Edwards No. 2,386,040 issued October 2, 1945.

The outputs of the alternating current generators 1 to 5 may be paralleled by means of the conductors 14, 16 and 18 connecting the buses coupled to their output terminals which buses are indicated by the reference characters A, B and C to identify the three phases thereof. Connected in phase A of each alternating current machine is a current transformer 20. Each current transformer has connected in parallel therewith a variable reactive device 21 and a variable resistive device 21' such as shown schematically. The parallel connections for the reactors 21 and the resistors 21' are obtained by virtue of the conductors 22 and 23 as may be seen from an inspection of the drawing. The reactors 21 and resistors 21' may each be varied between zero and some maximum value. For the purposes of explanation of Figs. 2 and 3, it is assumed that the resistors 21' are all zero so that only the reactors 21 appear in parallel with the respective current transformers 20. A potential transformer 24 has its primary winding 26 connected across the B and C phases of one of the alternating current machines by means of the conductors 28 and 30. A secondary winding 32 of the potential transformer is connected at its upper end to one side of the curent transformers 20 by means of a conductor 33. The other end of the transformer secondary 32 is connected by means of a conductor 34 to each of a plurality of rectifying devices 35, 36, 37, 38 and 39 through load resistors 40, 41, 42, 43 and 44 respectively. Also connected to the output of the rectifying devices 35 to 39 are one end of the control fields 12 of the amplidynes 10. A conductor 46 couples the other end of the amplidyne control fields 12 and provides a common connection therebetween. A conductor 47 completes the circuit for the current transformer 20 associated with the phase A of generator 1 to the input of the first rectifying device 35 which is poled to conduct positive going pulses of current from the current transformer 20. Also provided are conductors 48, 50, 52 and 54 which complete the connections for the current transformers and reactors associated with each of the other alternating current machines 2, 3, 4 and 5 respectively.

In Fig. 2 of the drawing there is shown a vector diagram of the voltages between the phases A, B and C, and a vector diagram of the current associated with one of the phases. As mentioned, it is assumed that only the reactors 21 appear in parallel with the respective current transformers 20. Voltage vectors are indicated by the reference numerals 56, 58 and 60, while the current vector is indicated by the reference numeral 62. The vector 62 indicates the active current or the current having unity power factor in relation to a line to neutral voltage at phase A. This current will develop a voltage across the reactor 21, which by virtue of the inductance therein will be shifted in phase 90° as indicated by the vector shown at 64. The voltage shown at 64 when added to the voltage between the phases B and C is in phase therewith and, consequently, any change therein will produce a correspondingly large change in the total signal supplied to each rectifier 35 to 39 as may be seen in the vector diagram in Fig. 3. Also shown in Fig. 3 is a dotted line 66 which is indicative of the voltage across the reactor 21 due to the effect of the reactive current at phase A and which, as a consequence of the phase shift in the reactor, is at a right angle to the vector 58. This shows that any change in the reactive current will have very little effect on the total signal applied to the rectifier, whereas a change in the voltage porportional to the active current 62 will have a much more appreciable effect. Since the output of an alternating current machine in kilowatts is a function of the terminal voltage times the active current, it may be seen, therefore, that deriving a control signal proportional to the active current provides a means for regulating the output of the generator as conditions vary. If desired, and as shown in Fig. 2(a), the control signal which includes a voltage proportional to the voltage between two of the phases and a voltage proportional to the active current may be derived by adding the voltage indicated by vector 58 to voltage proportional to the sum of the active currents 70, 71 at the phases B and C. It may be shown that when these two currents 70, 71 are added, the resultant 72 is at 90° to the vector 58 and, therefore, the voltage 73 it produces across a reactor will be in phase with the voltage 58. In other forms of my invention, and as shown in Fig. 2(b), a voltage signal 74 at one of the phases from line to neutral may be obtained and a signal 75 proportional to the active current derived at that phase by the use of a resistor 21' in parallel with a current transformer 20 or the voltage across two phases may be used as a voltage signal proportional to the active current at one of those phases obtained by suitably coupling a reactor 21 and resistor 21' in shunt with the current transformer 20. Thus, it may be seen that in its broadest terms a signal proportional to output voltage and another proportional to active current are added to derive a control signal and combinations and devices other than those described may be determined from an inspection of Figs. 2 and 3. Alternatively, if it is desired to make the regulation of the generators proportional to the reactive current, the resistors 21' may be connected in parallel with the current transformers 20 instead of the reactors 21. This is done by making the reactors 21 zero so that only the resistors 21' appear in parallel with the current transformers 20. In this connection, see the vector diagram in Fig. 2(c). In this case, the voltage 76 across the resistors 21' will be in phase with vector 58 since the reactive current at phase A is already in phase with this vector 58. It will also be apparent to persons skilled in the art that combinations of values of the resistors 21' and the reactors 21 may be used to provide the desired vectors.

Referring again to Fig. 1 of the drawing, the operation of this embodiment of my invention is as follows: Assume that due to variations in the characteristics of the individual generators, prime movers or speed control means, there is an increase in output of one of the generators. This will cause a corresponding increased direct current from one of the rectifier devices 35 to 39 associated with this generator. There will then be an increased direct current through the load resistor associated with the rectifier device experiencing the increased direct current. Therefore a current flows in the associated amplidyne control field 12 in a direction so as to reduce the output of that generator. Currents will flow in the control elements 12 in the directions indicated inasmuch as the voltage at the junction of the control element 12 with its associated load resistor associated with the generator supplying the increased output will be higher than the voltage existing at the junction of the remaining control elements 12 with their associated load resistors. At the same time, current will flow in the other amplidyne control fields 12 in a direction so as to boost the output of the other generators to re-distribute the load equally there-between. Alternatively, if the output of one of the generators should decrease, a direct current of a lesser value will be supplied to its load resistor and a current flows in the associated control field 12 in a direction so as to boost the output of the one generator, and a current flows in the other control fields 12 in a direction to reduce the output of the other remaining generators. The following explanation is offered to aid in understanding the flow of currents in the conductor 46 and the control fields 12. As mentioned, the voltage supplied to each of the rectifiers 35 through 39 consists of a signal proportional to machine output voltage and a further signal proportional to machine real current output. If it be assumed that each of the generators has an equal output, the voltage across the rectifiers 35 through 39 are equal and so, therefore, are the voltages at the junctions of the control fields 12 and their respective resistors 40 through 44. Under these circumstances, no currents will flow through the control fields 12. If, for instance, the generator 1 should assume a bigger percentage of the load, the real current in its output phase A will increase and the voltage proportional thereto as applied to the rectifier 35 will correspondingly increase. Under these circumstances, the voltage at the junction of the control field 12 with the load resistor 40 is higher than the voltage at the junctions of the remaining control fields with their associated load resistors. Current will therefore flow upwardly, as shown in the drawing, through the control field 12 associated with the rectifier 35 and downwardly through the remaining control fields 12 to the conductor 34. Since the conductor 34 is part of a circuit which may be traced through the transformer secondary winding 32, the conductor 33, and the current transformer 20 back to the rectifier 35, it may therefore be seen that this current has a complete path. If it is assumed that current flow through the control fields 12 in an upward direction, as shown in the drawing, tends to adjust the speed control means for the generator prime movers so as to decrease their power output and that current flow through the control fields 12 in a downward direction, as shown in the drawing, tends to adjust the speed control means for the generator prime movers so as to increase their power output, then it will be seen that the generator 1 (which was assumed to produce too much output) will decrease its output and the other generators 2, 3, 4, 5 will increase their output.

In the embodiment shown, the outputs of the generators are illustrated as being paralleled by means of the conductors 14, 16 and 18. If it is not desired to parallel the output of the generators, these conductors may be eliminated. This will require, of course, a separate potential transformer for each of the rectifying devices 35 to 39. Otherwise, there will be no change in the circuit and the operation will be that as described above.

If it is not desired to provide for equal load distribution amongst the generators, then the reactors may be adjusted by any suitable means as shown schematically and any distribution of the load desired may be achieved.

If it is desired to provide a greater control signal for each generator unit, then full-wave rectifying devices may be used as illustrated in another embodiment of my invention shown in Fig. 4. In this figure of the drawing, corresponding parts of the embodiments have been given the same reference numeral. Thus, each generator unit consists of the generator 1, prime mover 6, D.C. control motor 8 and amplidyne 10, each amplidyne 10 having a control field 12. A potential transformer 24' is provided with its primary 26' connected by means of the conductor 28' to one of the phases B. The other end of the transformer primary 26' associated with the generator 4 is connected by means of the conductor 68 to the reactor 21. A conductor 69 returns the reactor to the other phase C of the transformer so that the voltage across the reactor is added to the voltage across the phases B and C. Similarly, conductors 70, 72 and 73 associated with the generators 1, 2 and 3 respectively return the upper ends of the potential transformers to the current transformer and reactor combinations 20 and 21 and, in turn, to the phase C by the conductor 76. The secondary 32' of each potential transformer 24' is connected to the input of the full-wave bridge rectifier 35' the output of which is connected the load resistors 40', 41' and 42'. A conductor 78 provides a common connection there-between while the amplidyne control fields 12 are provided with a common connection 46'.

The embodiment shown in this figure of the drawing operates in the same manner as the embodiment illustrated in Fig. 1 with the exception that a full-wave rectified signal is supplied to the control windings 12 in order to provide a greater output.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A regulating system for a plurality of alternating current dynamoelectric machines driven by prime movers comprising means for deriving a first voltage signal proportional to the output voltage of at least one of said machines, means for deriving a second voltage signal in phase with said first voltage signal proportional to the output current of each of said machines, means for controlling said prime movers including motive means and means for controlling said motive means including means responsive to said first and second voltage signals to insure the maintenance of a predetermined distribution of the output of said machines.

2. A regulating system for a plurality of alternating current dynamoelectric machines driven by prime movers, comprising means for deriving a first voltage signal proportional to the output of all of said machines, means for deriving a plurality of second voltage signals in phase with said first voltage signal proportional to the output current of each of said machines, means for controlling said prime movers including motors, means for controlling said motors, said motor control means including a control element for each of said motors, said control elements having common connections, and means for supplying said first voltage signal and one of said second voltage signals to each of said control elements.

3. A regulating system for alternating current dynamoelectric machines wherein each machine is driven by a separate prime mover, control means including a direct current motor for each prime mover, means for deriving a first voltage signal proportional to the output voltage of said machines, means for deriving a plurality of second voltage signals in phase with said first voltage signal proportional to the output current of each of said machines, means controlling said direct current motors including a control element for each motor, separate rectifier means for furnishing a control signal to each control element, means for supplying said first voltage and one of said second voltage signals to a rectifier means associated with the corresponding control element and means for providing a common connection between said control elements.

4. A regulating system for polyphase alternating current dynamoelectric machines wherein each machine is driven by a separate prime mover, control means for each prime mover including a direct current motor, transformer means having a primary winding connected across two phases of the output of one of said machines, a plurality of current transformers for deriving a signal from another phase of the output of each of said machines, a variable reactor connected in parallel with each current transformer, means controlling each direct current motor including a control element, a rectifier device for supplying a control signal for each control element, a secondary winding of said transformer means coupled to each rectifier device, means for coupling the voltage across each variable reactor to a rectifier associated with a corresponding control element for the machine and prime mover controlled by the element and means for connecting said control elements in parallel.

5. A regulating system as defined in claim 4 wherein each rectifying device comprises a full-wave rectifier and said transformer means comprises a separate transformer provided for each rectifying device.

6. A regulating system as defined in claim 4 wherein each rectifying device is a half-wave rectifier and said transformer means comprises a single transformer wherein one end of the secondary of said transformer is connected to one side of each of said rectifying devices and the other end of said transformer is connected to said current transformers.

7. A regulating system as defined in claim 4 wherein said means controlling each direct current motor comprises an amplidyne for each motor and said control elements comprise control windings associated with each amplidyne.

References Cited in the file of this patent

UNITED STATES PATENTS

| | | |
|---|---|---|
| 2,707,241 | Griscom | Apr. 26, 1955 |
| 2,710,355 | Chilman et al. | June 7, 1955 |
| 2,791,700 | Chilman et al. | May 7, 1957 |
| 2,791,701 | Chilman et al. | May 7, 1957 |

UNITED STATES PATENT OFFICE
CERTIFICATE OF CORRECTION

Patent No. 2,914,680                                          November 24, 1959

Alan S. Rubenstein

It is hereby certified that error appears in the printed specification of the above numbered patent requiring correction and that the said Letters Patent should read as corrected below.

Column 2, line 48, for "local" read -- load --; column 3, line 2, for "curent" read -- current --; line 46, for "porportional" read -- proportional --.

Signed and sealed this 21st day of June 1960.

(SEAL)
Attest:
KARL H. AXLINE
Attesting Officer

ROBERT C. WATSON
Commissioner of Patents